(12) United States Patent
Yamaura et al.

(10) Patent No.: US 9,191,557 B2
(45) Date of Patent: Nov. 17, 2015

(54) ELECTRONIC DEVICE

(71) Applicant: PANASONIC CORPORATION, Osaka (JP)

(72) Inventors: Hiroshi Yamaura, Osaka (JP); Ruriko Monobe, Osaka (JP); Koji Masuda, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/193,690

(22) Filed: Feb. 28, 2014

(65) Prior Publication Data

US 2014/0253777 A1 Sep. 11, 2014

(30) Foreign Application Priority Data

Mar. 6, 2013 (JP) ................................. 2013-043687
Jan. 16, 2014 (JP) ................................. 2014-005594

(51) Int. Cl.
*H04N 5/222* (2006.01)
*H04N 5/225* (2006.01)

(52) U.S. Cl.
CPC ................................. *H04N 5/2252* (2013.01)

(58) Field of Classification Search
CPC . H04N 5/2251; H04N 5/2252; H04N 5/2253; H04N 5/2254; H04N 5/23293
USPC ............................................ 348/333.06, 373
See application file for complete search history.

(56) References Cited

U.S. PATENT DOCUMENTS

| | | | |
|---|---|---|---|
| 2009/0207303 A1* | 8/2009 | Kusatsugu et al. | 348/376 |
| 2012/0081593 A1* | 4/2012 | Nakagawa et al. | 348/333.06 |
| 2013/0038769 A1* | 2/2013 | Xiaoping | 348/333.01 |
| 2013/0093946 A1* | 4/2013 | Nakagawa | 348/374 |
| 2013/0107101 A1* | 5/2013 | Akiyama | 348/333.07 |
| 2014/0055657 A1* | 2/2014 | Koda | 348/333.06 |
| 2015/0038841 A1* | 2/2015 | Ichimura | 600/437 |

FOREIGN PATENT DOCUMENTS

JP 2001-333298 A 11/2001

* cited by examiner

*Primary Examiner* — Sinh Tran
*Assistant Examiner* — Zhenzhen Wu
(74) *Attorney, Agent, or Firm* — McDermott Will & Emery LLP

(57) ABSTRACT

The present technique includes a case member of a body and a supporting mechanism. The case member of a body includes a holding compartment having a shaft support at one end of the holding compartment. The supporting mechanism is receivable in the holding compartment of the case member and holds a display monitor. The supporting mechanism includes a first supporting member and a second supporting member, the first supporting member having, at a first end, a pivoting portion pivotally supported on the shaft support of the holding compartment, and a shaft support at a second end, and the second supporting member having a pivoting portion pivotally supported on the shaft support of the first supporting member. The supporting mechanism is configured to move the shaft support of the first supporting member and the pivoting portion of the second supporting member in an extrusion direction from the holding compartment.

6 Claims, 11 Drawing Sheets

ELECTRONIC DEVICE

RELATED APPLICATIONS

This application claim the benefit of Japanese Application No. 2013-043687, filed on Mar. 6, 2013 and Japanese Application No. 2014-005594, filed Jan. 6, 2014, the disclosures of which Applications are incorporated by reference herein.

BACKGROUND OF THE INVENTION

1. Field of the Invention

The present technique relates to an electronic device such as a digital camera with a rotatable display unit.

2. Description of the Related Art

Unexamined Japanese Patent Publication No. 2001-333298 discloses an electronic device such as a digital camera with a display monitor rotatable relative to its body.

SUMMARY OF THE INVENTION

An electronic device of the present technique includes a case member of a body including a holding compartment having a shaft support at one end of the holding compartment and a supporting mechanism receivable in the holding compartment of the case member. The supporting mechanism includes a first supporting member and a second supporting member, the first supporting member having, at a first end, a pivoting portion pivotally supported on the shaft support of the holding compartment and a shaft support at a second end, and the second supporting member having a pivoting portion pivotally supported on the shaft support of the first supporting member. The holding compartment of the case member includes a cam portion in a region corresponding to where the shaft support of the first supporting member is located. The second supporting member of the supporting mechanism includes an abutment portion having a cam surface, which forms a cam mechanism with the cam portion of the case member, on the pivoting portion pivotally supported on the shaft support of the first supporting member. The supporting mechanism is configured such that the cam portion presses the cam surface of the abutment portion by rotation of the second supporting member to move the shaft support side of the first supporting member and the pivoting portion of the second supporting member in an extrusion direction from the holding compartment.

DETAILED DESCRIPTION OF THE PREFERRED EMBODIMENTS

Embodiments of an electronic device of the present technique will be described below with reference to an example of a digital camera and the accompanying drawings. Unnecessary detail, however, may be omitted. For example, the detailed description of a well-known matter and a repeated description of substantially the same configuration may be omitted. This is to avoid unnecessary redundancy in the following description and to facilitate understanding by those skilled in the art.

The applicant provides the accompanying drawings and the description below to enable those skilled in the art to have a thorough understanding of the present technique, and these are not intended to limit the subject matter defined by the claims.

[1. Configuration]

Figure 1:
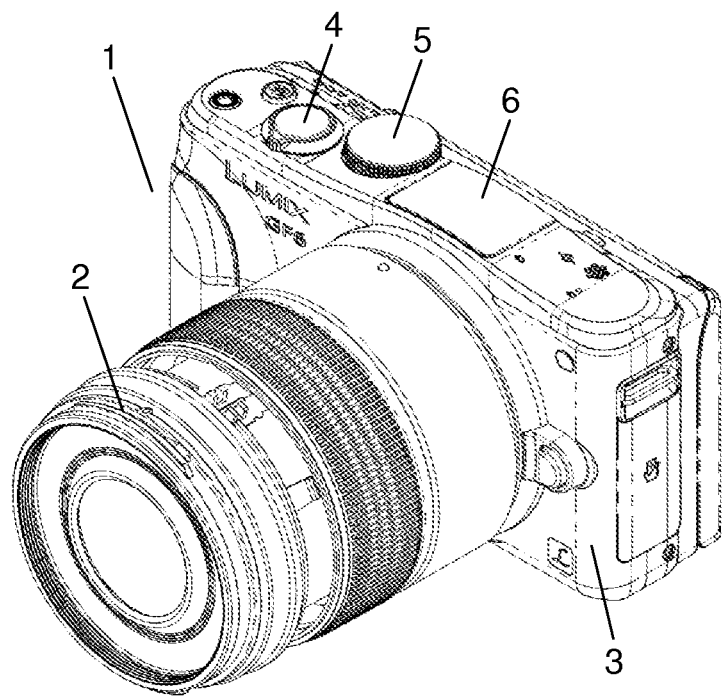
FIG. 1 is a perspective view illustrating an appearance viewed from the front side of a digital camera according to an embodiment of the technique.
Figure 2:
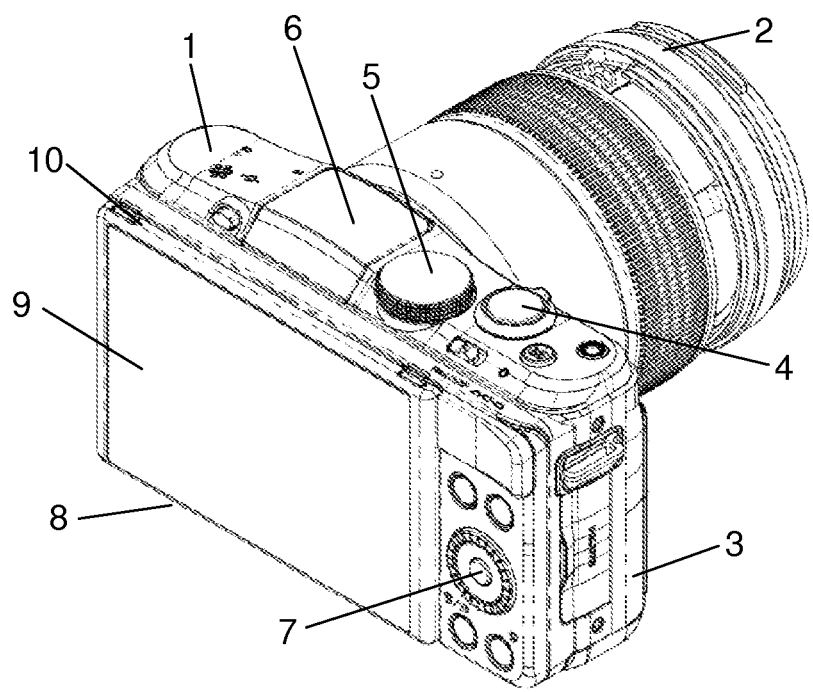
FIG. 2 is a perspective view illustrating an appearance viewed from the rear side of the digital camera shown in FIG. 1.

FIG. 1 is a perspective view illustrating an appearance viewed from the front side of a digital camera according to an embodiment of the technique. FIG. 2 is a perspective view illustrating an appearance viewed from the rear side of the digital camera shown in FIG. 1.

As shown in FIGS. 1 and 2, the digital camera has body 1 and interchangeable lens 2 mountable on body 1. Body 1 is configured to house, in a case 3, an imaging unit with an image sensor such as a complementary metal-oxide semiconductor (CMOS) sensor for capturing a subject image and a control unit equipped with an image processing circuit for processing image data obtained from the imaging unit and a control circuit for controlling the entire camera.

The upper portion of body 1 is provided with release button 4, mode dial 5 for setting imaging conditions, flash 6 with a hop-up mechanism, etc. The back side of body 1 is provided with operation button 7 for operating the imaging conditions and the operation mode of the entire camera and display unit 8 serving as display means for displaying a through-the-lens image of a subject image obtained from the imaging unit, a playback image taken, etc. Display unit 8 includes display monitor 9 including a liquid crystal panel or the like for displaying the through-the-lens image of the subject image, the playback image taken, etc. and supporting mechanism 10 for rotatably holding display monitor 9.

Figure 3:
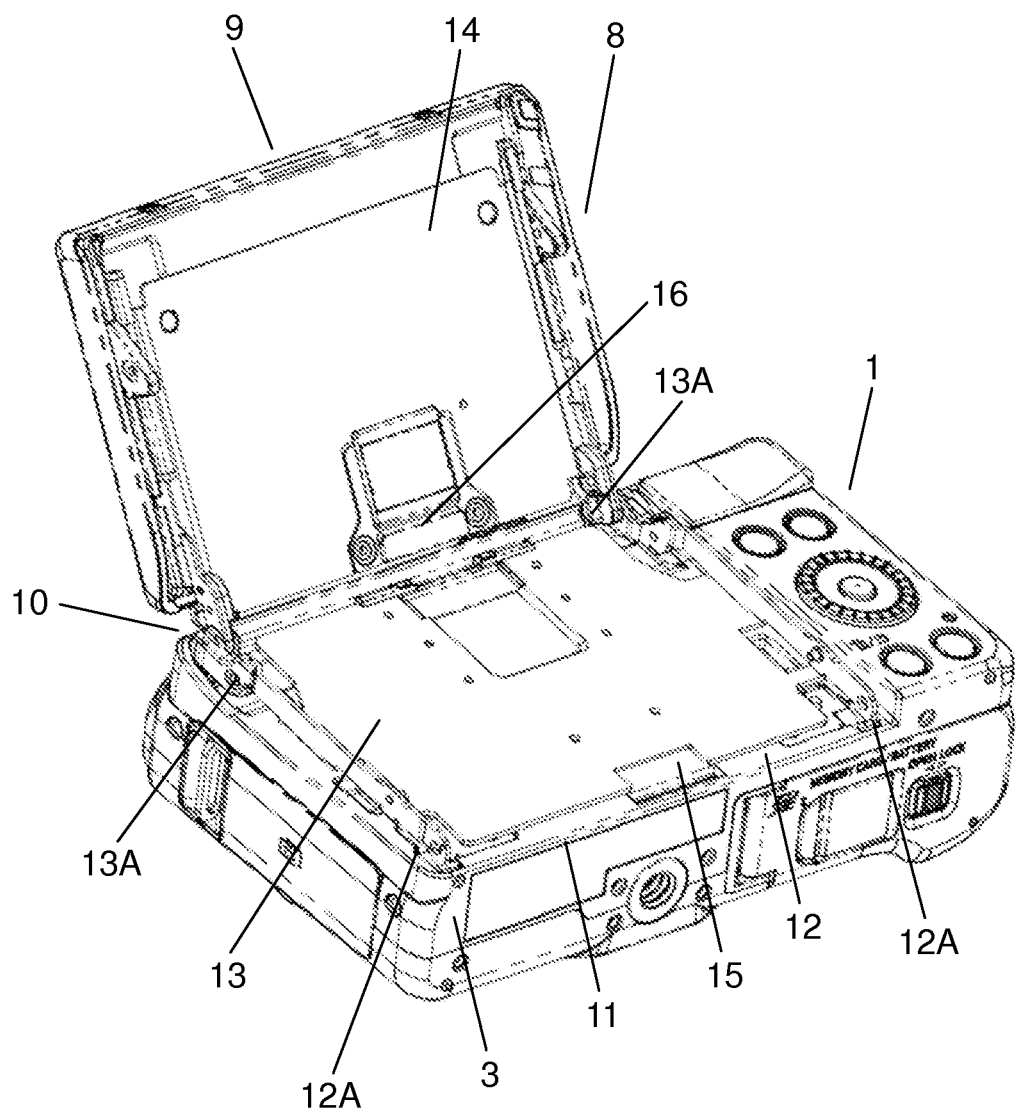
FIG. 3 is a perspective view illustrating a state in which a display monitor is rotated in a display unit of a body.
Figure 4:
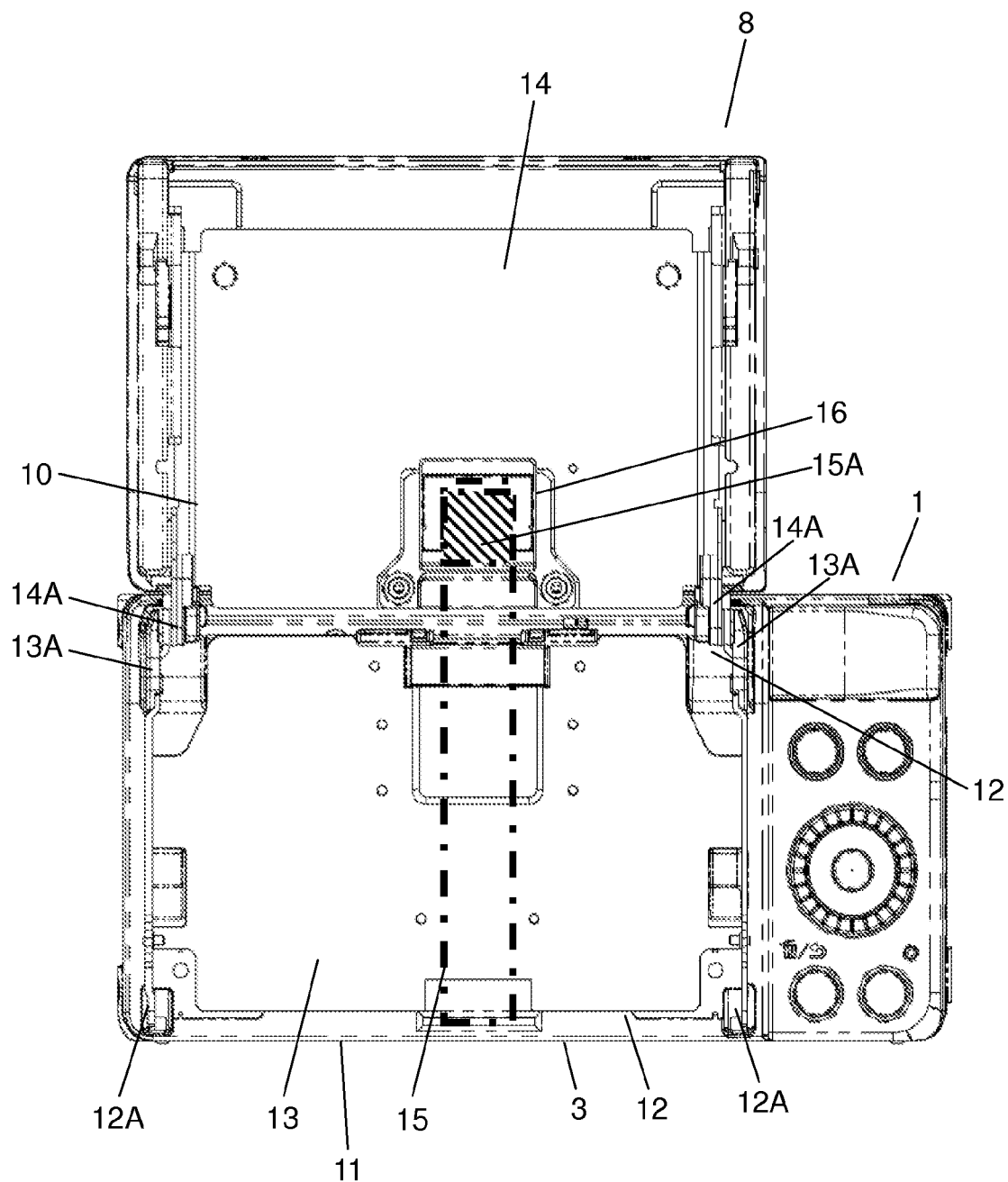
FIG. 4 is a plan view illustrating a state in which the display monitor is rotated by 180 degrees from the state shown in FIG. 2 in the display device of the body.
Figure 5:
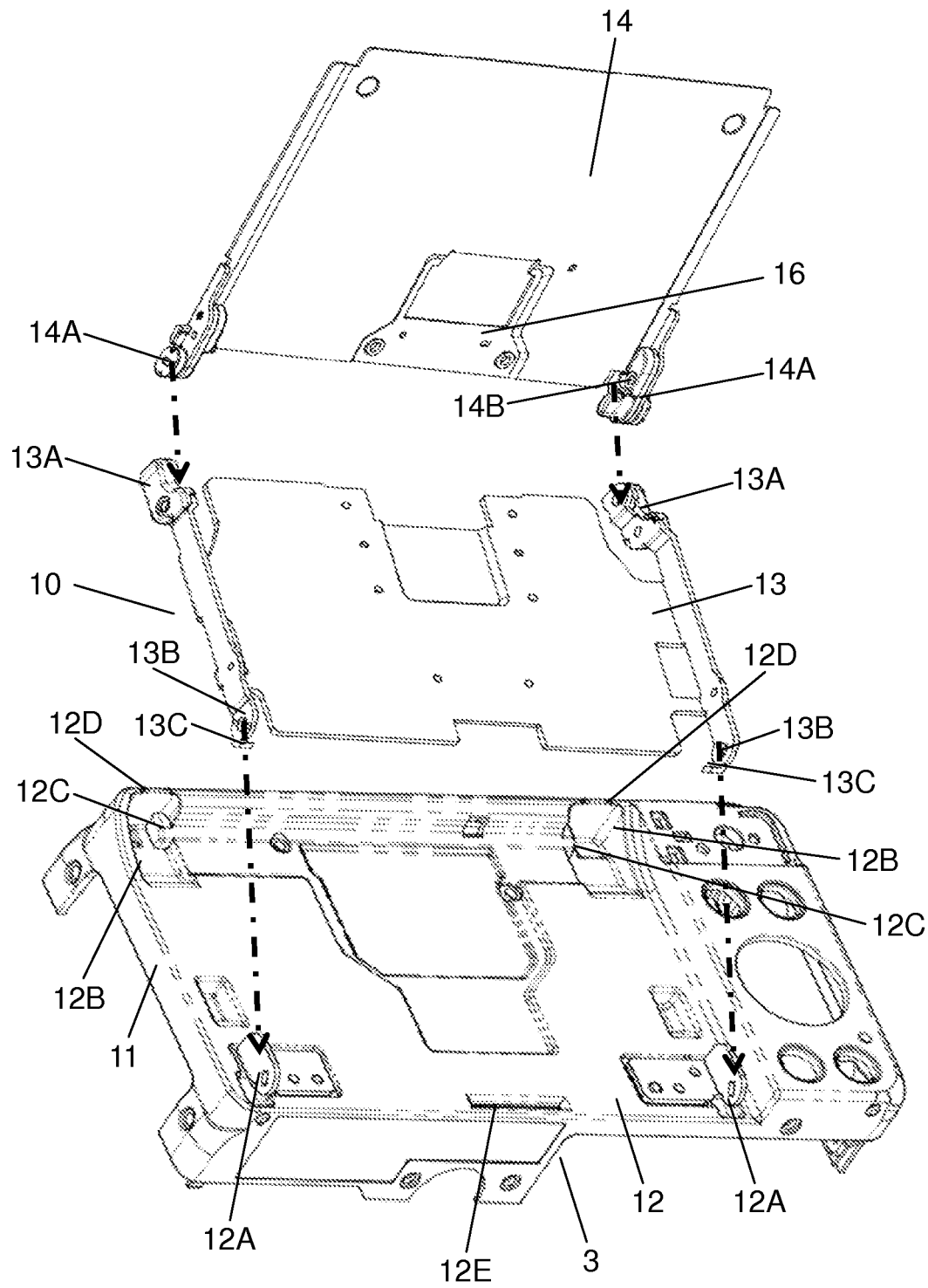
FIG. 5 is an exploded perspective view illustrating the configuration of a supporting mechanism in the display device of the body.
Figure 6:
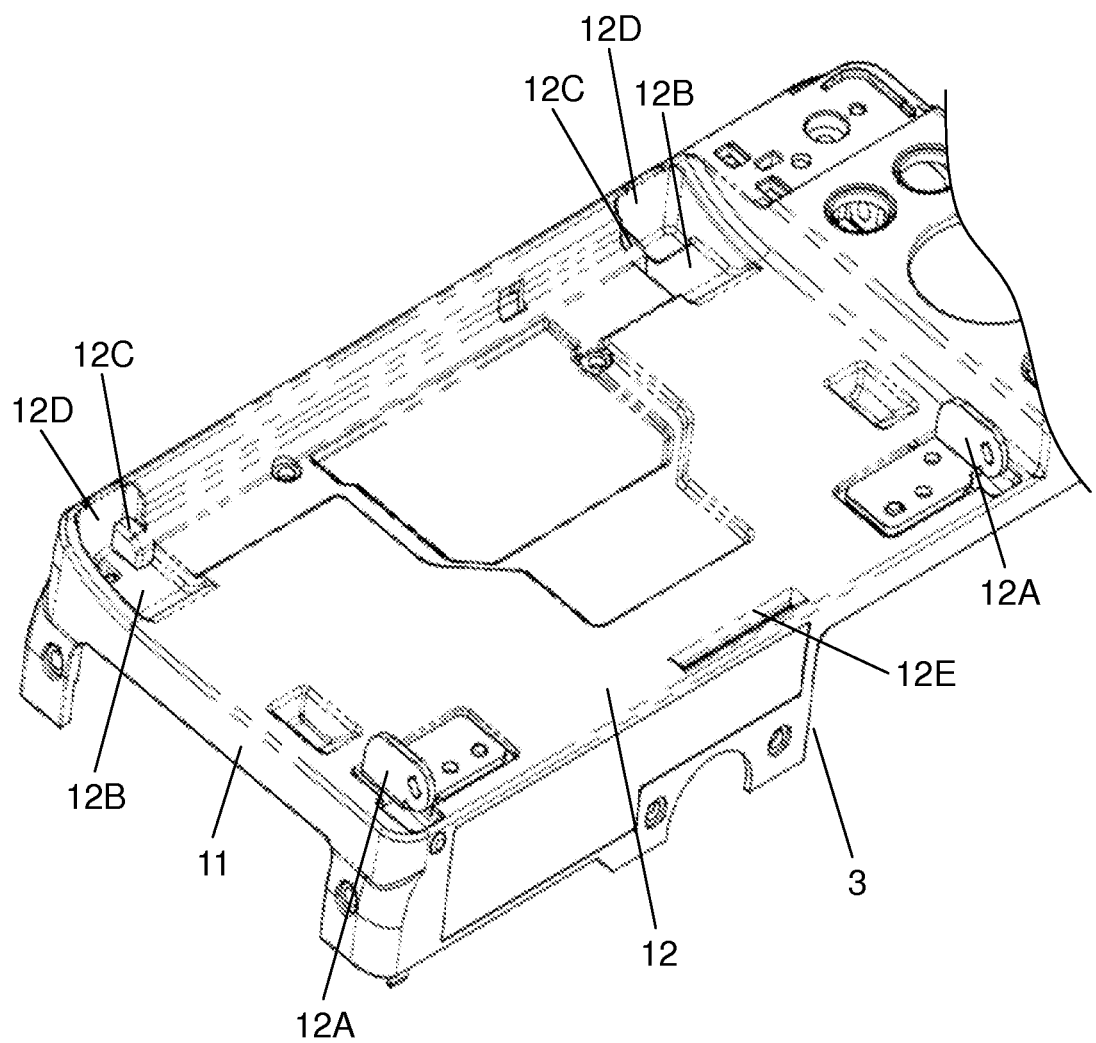
FIG. 6 is a perspective view illustrating the configuration of a component of the supporting mechanism.
Figure 7:
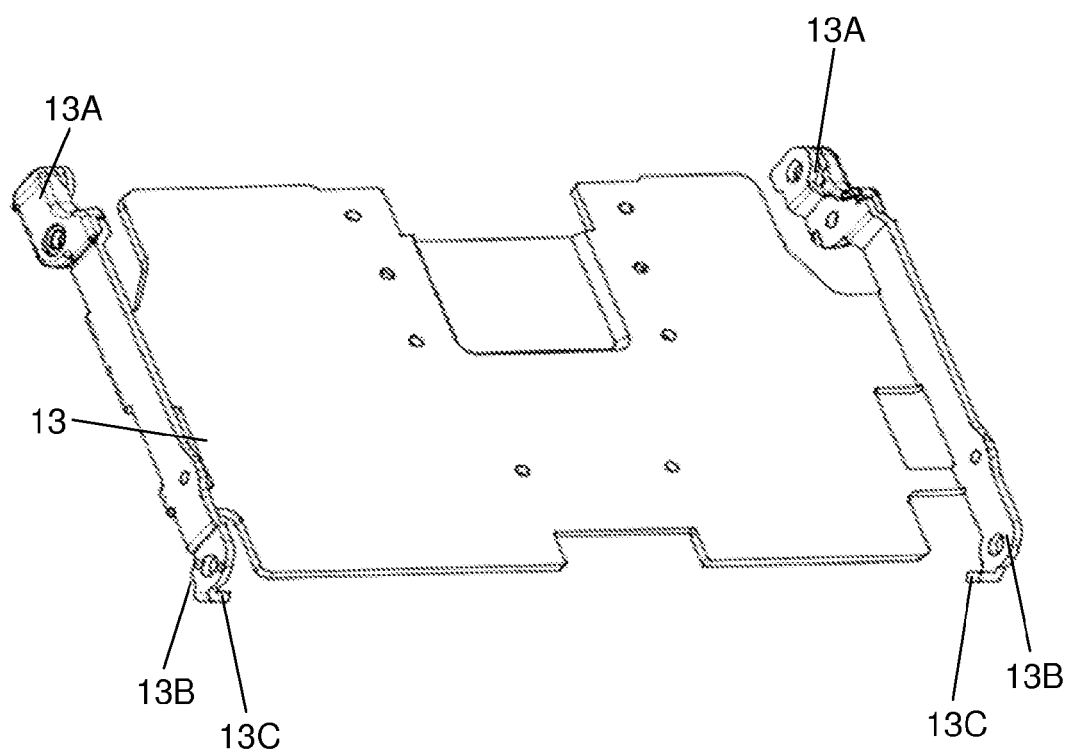
FIG. 7 is a perspective view illustrating the configuration of a component of the supporting mechanism.
Figure 8:
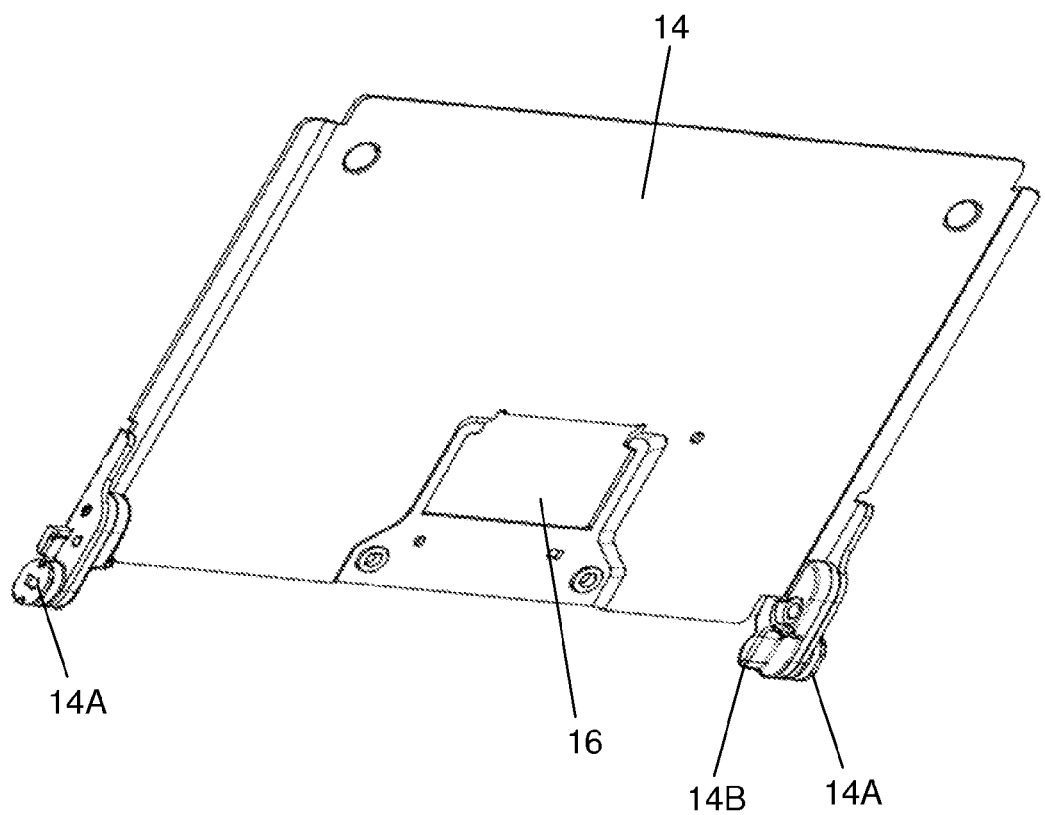
FIG. 8 is a perspective view illustrating the configuration of a component of the supporting mechanism.

FIG. 3 is a perspective view illustrating a state in which the display monitor is rotated in the display unit of the body. FIG. 4 is a plan view illustrating a state in which the display monitor is rotated by 180 degrees from the state shown in FIG. 2 in a display device of the body. FIG. 5 is an exploded perspective view illustrating the configuration of the supporting mechanism in the display device of the body. FIGS. 6 to 8 are perspective views illustrating the configuration of components constituting the supporting mechanism.

As shown in FIGS. 3 to 5, display unit 8 includes rear case 11 made of resin as a case member, supporting mechanism 10 receivable in concave shaped holding compartment 12 provided in rear case 11, and display monitor 9 rotatably held by supporting mechanism 10.

Supporting mechanism 10 includes, in holding compartment 12, plate 13 as a first supporting member made of a metal plate that is pivotally supported on two shaft supports 12A provided at a first end on the lower side of body 1 and plate 14 as a second supporting member made of a metal plate that is pivotally supported on shaft supports 13A provided at a second end of plate 13. Display monitor 9 is mounted on plate 14 of supporting mechanism 10. Plates 13 and 14 are configured to substantially overlap with each other when display monitor 9 is received in holding compartment 12 of rear case 11. Plates 13 and 14 may not be plate-like and may be frame-shaped with the center portion being removed if the mechanical strength is ensured.

Wiring member 15, which is made of a flexible circuit board for electrically connecting display monitor 9 and a controller unit of body 1, is pulled out of body 1 through a slit provided at the lower portion of rear case 11 of body 1. Wiring member 15 as shown in FIG. 4 is guided to plate 14 through the interior of plate 13 and is introduced into plate 14 through wire inlet 16 provided in the end portion of plate 14. Wiring member 15 routed in plate 14 is electrically connected to display monitor 9 on the back side of display monitor 9.

Here, wiring member 15 has slack portion 15A curved into a substantially S-shape in at wire inlet 16 of plate 14. This allows slack portion 15A of wiring member 15 provided in wire inlet 16 to expand and contract corresponding to the pivoting operation of supporting mechanism 10 so that it is possible to prevent wiring member 15 from being broken by a pulling force applied to wiring member 15 associated with the rotation of supporting mechanism 10.

As shown in FIGS. 5 and 6, rear case 11 as the case member has, in the end portions of the upper side facing shaft supports 12A of holding compartment 12, two recesses 12B in which shaft supports 13A of plate 13 are accommodated. Each of recesses 12B in which shaft supports 13A of plate 13 are placed is provided with convex shaped first cam portion 12C adapted to protrude into recess 12B and second cam portion 12D provided at the end portion of recess 12B. Second cam portion 12D is formed such that the end portion of recess 12B is higher than the other portion in a wall forming holding compartment 12. This allows a side connected to body 1 of display monitor 9 to be housed together with supporting mechanism 10 without protruding from holding compartment 12 of rear case 11. As shown in FIGS. 5 and 6, holding compartment 12 of rear case 11 is provided with slit 12E through which wiring member 15 is pulled out.

Plate 13 constituting supporting mechanism 10 has pivoting portions 13B pivotally supported on shaft supports 12A of holding compartment 12 of rear case 11 as shown in FIGS. 5 and 7. Each of pivoting portions 13B is provided with claw portion 13C, which limits the rotation of pivoting portion 13B within a predetermined range of angle. Plate 13 has a length for shaft supports 13A to fit into recesses 12B with pivoting portions 13B being pivotally supported on shaft supports 12A of rear case 11.

Plate 14 constituting supporting mechanism 10 has pivoting portions 14A pivotally supported within a predetermined range of angle on shaft supports 13A of plate 13 as shown in FIGS. 5 and 8. Plate 14 has a length for its distal end to fit into holding compartment 12 of rear case 11 with pivoting portions 14A being pivotally supported on shaft supports 13A of plate 13. The inside of pivoting portions 14A on both sides of plate 14 is provided with abutment portions 14B made of resin at a position eccentric from pivoting portion 14A to the distal end. Each of abutment portions 14B has first cam surface 14C and second cam surface 14D forming a cam mechanism with first cam portion 12C and second cam portion 12D provided in recess 12B of holding compartment 12. First cam surface 14C of abutment portion 14B is provided on the inner surface facing first cam portion 12C of rear case 11, and second cam surface 14D is provided on the outer surface opposite to first cam surface 14C. That is, first cam surface 14C of abutment portion 14B abuts on first cam portion 12C and second cam surface 14D of abutment portion 14B abuts on second cam portion 12D.

Thus, when supporting mechanism 10 rotates plate 14 beyond a predetermined angle, first cam surface 14C of abutment portion 14B first abuts on first cam portion 12C. Then, when supporting mechanism 10 further rotates plate 14, second cam surface 14D of abutment portion 14B abuts on second cam portion 12D. In this manner, first cam portion 12C and second cam portion 12D press first cam surface 14C and second cam surface 14D of abutment portion 14B, respectively, so that shaft support 13A of plate 13 and pivoting portion 14A of plate 14 move in an extrusion direction from recess 12B of holding compartment 12.

[2. Operation]

Next, the operation of the display unit in the digital camera according to the embodiment of the technique will be described.

Figure 9:
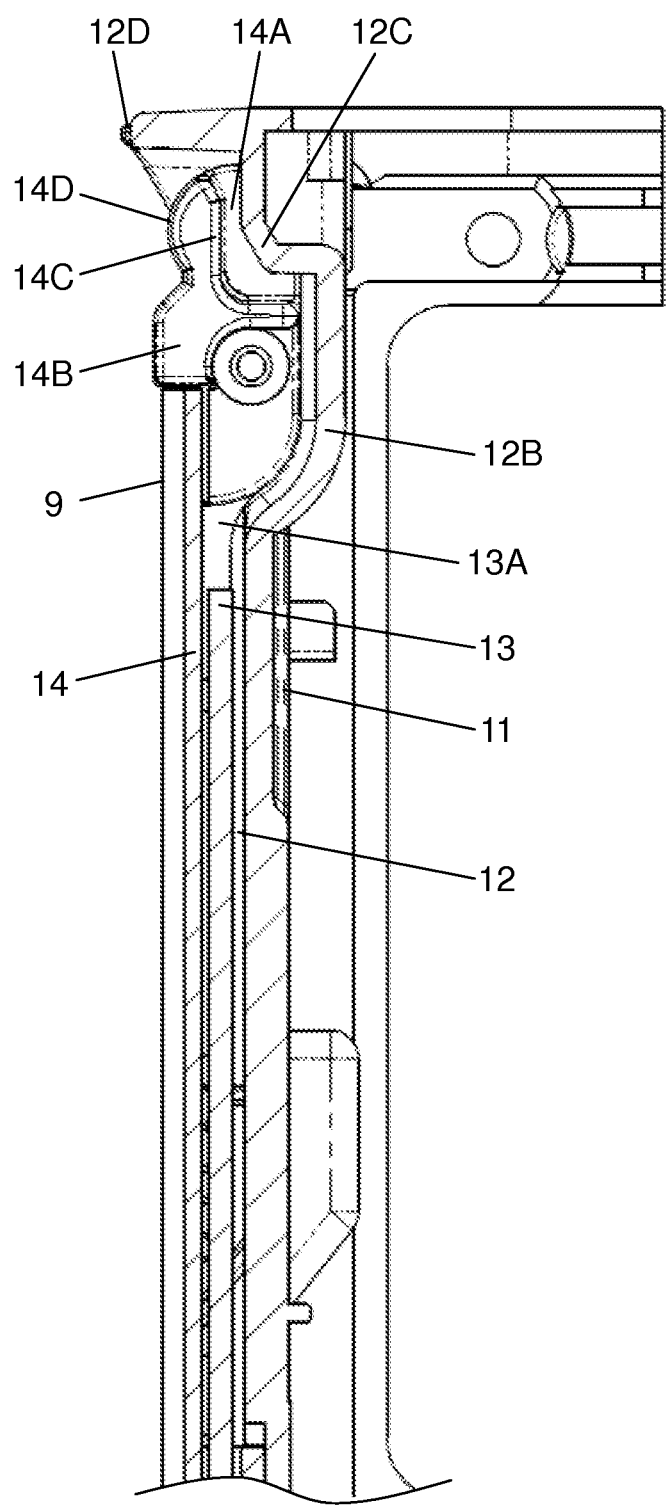
FIG. 9 is a sectional view of a state in which the display monitor is held in the holding compartment of a rear case in the display device of the body, as seen from the side thereof.

FIG. 9 is a sectional view of a state in which the display monitor is held in the holding compartment of a rear case in the display device of the body, as seen from the side thereof. FIGS. 10 to 15 are sectional views illustrating the operation of the supporting mechanism when it is rotated by 180 degrees from the state shown in FIG. 9.

Here, display unit 8 can perform an operation in a closed state (state shown in FIG. 9) where display monitor 9 is received in holding compartment 12 of rear case 11 and an operation in an open state where plate 14 is in an open position. Specifically, in a state where display unit 8 is open 180 degrees, the display screen of display monitor 9 is directed forward of the digital camera. In a closed state where display monitor 9 is received in holding compartment 12 of rear case 11, the display screen of display monitor 9 is directed rearward of the digital camera.

Figure 10:
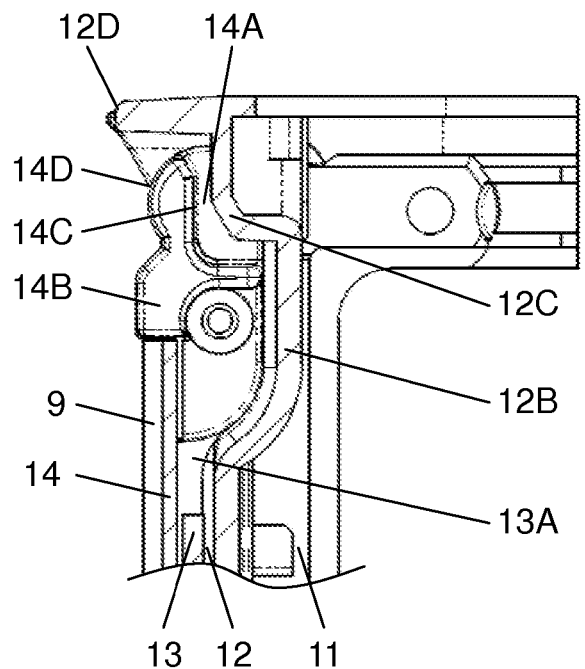
FIG. 10 is a sectional view showing the operation of the supporting mechanism.

As shown in FIG. 10, when display unit 8 is in a closed state, abutment portion 14B of plate 14 is received in recess 12B of rear case 11. Abutment portion 14B is not in contact with first cam portion 12C of rear case 11, and first cam surface 14C of abutment portion 14B faces first cam portion 12C of rear case 11. In this state, when a user pulls the bottom edge of display monitor 9 backward with a finger or the like, plate 14 is rotated backward accordingly, at which time plate 13 remains in a closed state.

Figure 11:
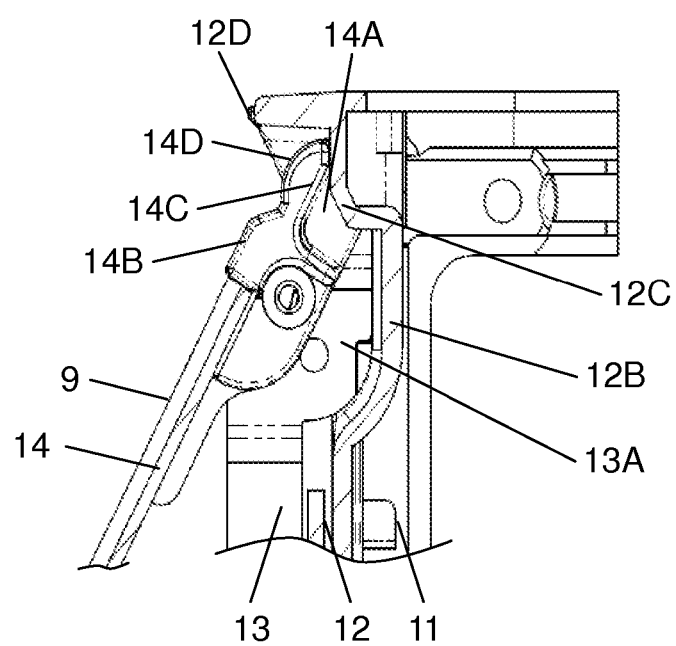
FIG. 11 is a sectional view showing the operation of the supporting mechanism.

As shown in FIG. 11, when plate 14 is rotated while plate 13 is in a closed state, abutment portion 14B also rotates around pivoting portion 14A and first cam surface 14C of abutment portion 14B abuts on first cam portion 12C.

Figure 12:
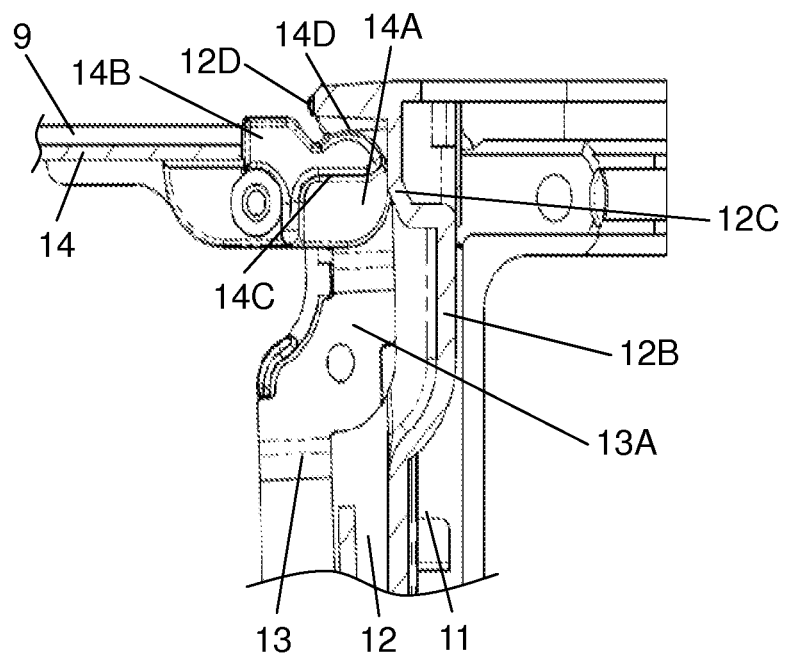
FIG. 12 is a sectional view showing the operation of the supporting mechanism.

As shown in FIG. 12, when plate 14 is further rotated, first cam portion 12C presses first cam surface 14C of abutment portion 14B and plate 14 moves from holding compartment 12 of rear case 11 in pull-out direction. FIG. 12 illustrates a state in which plate 14 is rotated approximately 90 degrees, where abutment portion 14B is in contact with first cam portion 12C on first cam surface 14C and abutment portion 14B itself rotates while maintaining a contact with first cam portion 12C. Consequently, shaft support 13A of plate 13 pivotally supporting pivoting portion 14A also moves from holding compartment 12 of rear case 11 in pull-out direction, and plate 13 rotates around shaft support 12A.

Figure 13:
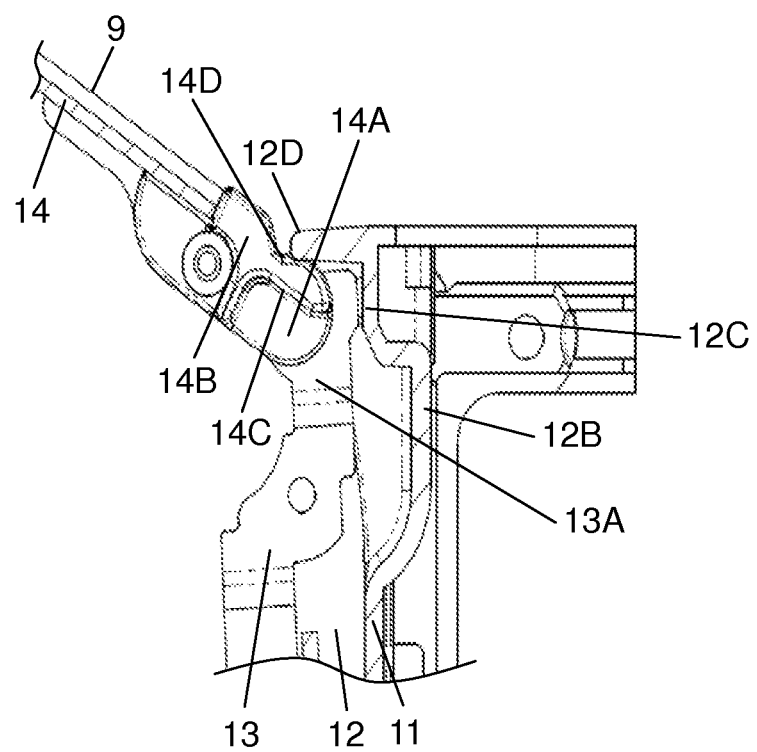
FIG. 13 is a sectional view showing the operation of the supporting mechanism.

Next, as shown in FIG. 13, when plate 14 is further rotated, second cam surface 14D of abutment portion 14B abuts on second cam portion 12D of rear case 11. FIG. 13 illustrates a state in which plate 14 is rotated approximately 120 degrees.

Figure 14:
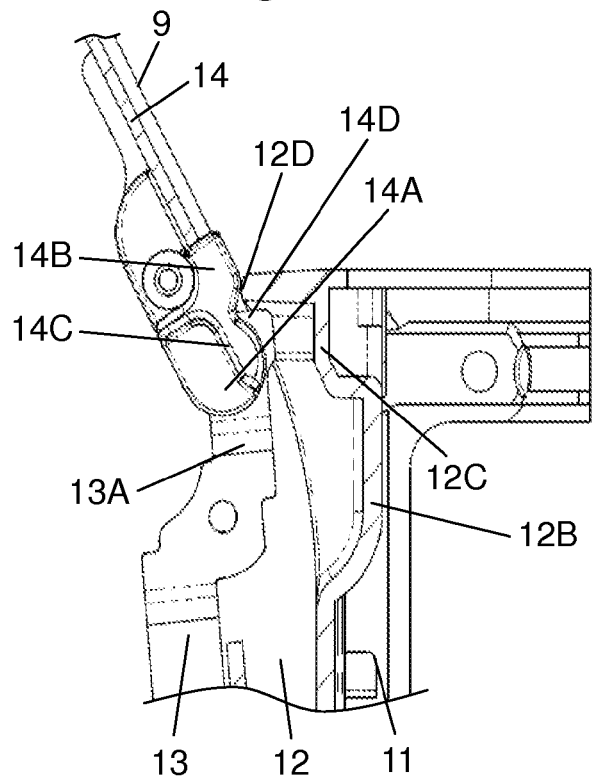
FIG. 14 is a sectional view showing the operation of the supporting mechanism.

As shown in FIG. 14, when plate 14 is still further rotated, second cam portion 12D presses second cam surface 14D of abutment portion 14B and plate 14 further moves from holding compartment 12 of rear case 11 in pull-out direction. FIG. 12 illustrates a state in which plate 14 is rotated approximately 150 degrees, where abutment portion 14B is in contact with second cam portion 12D on second cam surface 14D and abutment portion 14B itself rotates while maintaining a contact with second cam portion 12D. Consequently, shaft support 13A of plate 13 pivotally supporting pivoting portion 14A also moves from holding compartment 12 of rear case 11 in pull-out direction, and plate 13 further rotates around shaft support 12A.

Figure 15:
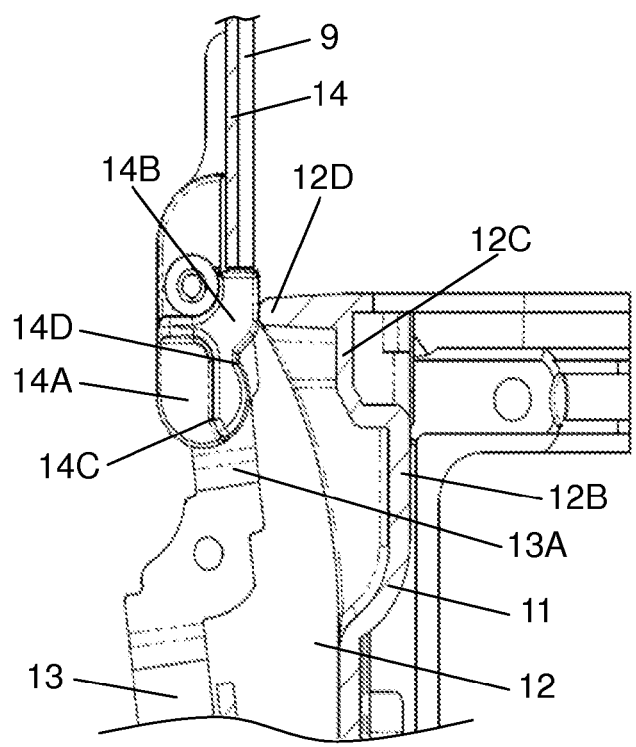
FIG. 15 is a sectional view showing the operation of the supporting mechanism.

As shown in FIG. 15, when plate 14 is still further rotated up to 180 degrees, abutment portion 14B rotates into contact with second cam portion 12D. Consequently, shaft support 13A of plate 13 pivotally supporting pivoting portion 14A also further moves from holding compartment 12 of rear case 11 in pull-out direction, and plate 13 still further rotates around shaft support 12A. Thus, the display screen of display monitor 9 of display unit 8 is directed forward of the digital camera.

[3. Conclusion]

As described above, the electronic device of the present technique includes rear case 11 of body 1 including holding compartment 12 having shaft supports 12A at one end and supporting mechanism 10 that can be received in holding compartment 12 and holds display monitor 9. Supporting mechanism 10 includes plate 13 and plate 14, plate 13 having, at a first end, pivoting portions 13B pivotally supported on shaft supports 12A of holding compartment 12 and shaft supports 13A at the a second end and plate 14 having pivoting portions 14A pivotally supported on shaft supports 13A of plate 13. Holding compartment 12 includes first cam portions 12C and second cam portions 12D in respective regions where shaft supports 13A of plate 13 are located. Plate 14 of supporting mechanism 10 includes abutment portions 14B having first and second cam surfaces 14C and 14D forming a cam mechanism with first and second cam portions 12C and 12D, on pivoting portions 14A side pivotally supported on shaft supports 13A of plate 13. Supporting mechanism 10 is configured such that first and second cam portions 12C and 12D press first and second cam surfaces 14C and 14D of abutment portions 14B, respectively, by rotation of plate 14 to move shaft support 13A of plate 13 and pivoting portions 14A of plate 14 in an extrusion direction from holding compartment 12.

This configuration allows supporting mechanism 10 to rotate plate 14 beyond a predetermined angle, and shaft support 13A of plate 13 and pivoting portions 14A of plate 14 moves in an extrusion direction from recesses 12B of holding compartment 12, thereby smoothly rotating plate 14 without interfering with other members of body 1. As a result, an electronic device can be provided that is capable of smoothly rotating display monitor 9 by 180 degrees.

[4. Other Embodiments]

The embodiment described above is configured such that first and second cam portions 12C and 12D of rear case 11 abut on first and second cam surfaces 14C and 14D of abutment portions 14B of plate 14. However, embodiments are not limited to this, and a cam mechanism may be formed by any one of a cam portion and a cam surface.

In addition, while the display unit of a digital camera has been described as an exemplary embodiment of the technique, it can be applicable to any electronic device having a display monitor such as a car navigation system.

As described above, the embodiments are described as examples of the technique, for which the accompanying drawings and detailed description are provided.

Accordingly, some of the components described in the accompanying drawings and detailed description may be those not essential for solving the problem as well as those essential for solving the problem in order to illustrate the above technique. Therefore it should be understood that the accompanying drawings and detailed description of non-essential components does not mean immediately that those non-essential components are essential.

The embodiments described above are to illustrate the present technique, and various modifications, substitutions, additions, and omissions can be made within the scope of the invention or the equivalents thereof.

What is claimed is:

1. An electronic device comprising:
   a case member of a body including a holding compartment having a shaft support at one end of the holding compartment and
   a supporting mechanism that is receivable in the holding compartment of the case member and holds a display monitor,
   wherein
   the supporting mechanism includes a first supporting member and a second supporting member, the first supporting member having, at a first end, a pivoting portion pivotally supported on the shaft support of the holding compartment, and a shaft support at a second end, and the second supporting member having a pivoting portion pivotally supported on the shaft support of the first supporting member,
   the holding compartment of the case member includes a cam portion in a region where the shaft support of the first supporting member is located,
   the second supporting member of the supporting mechanism includes an abutment portion having a cam surface, which forms a cam mechanism with the cam portion of the case member, on the pivoting portion pivotally supported on the shaft support of the first supporting member, and
   the supporting mechanism is configured such that the cam portion presses the cam surface of the abutment portion by rotation of the second supporting member to move the shaft support of the first supporting member and the pivoting portion of the second supporting member in an extrusion direction from the holding compartment.

2. The electronic device according to claim 1, wherein the holding compartment of the case member has a recess in which the shaft support of the first supporting member is accommodated, and the cam portion is formed in the recess.

3. The electronic device according to claim 1, wherein the abutment portion is formed at a position eccentric from the pivoting portion of the second supporting member.

4. The electronic device according to claim 1, wherein the second supporting member of the supporting mechanism is provided with the display monitor, and a wiring member for electrically connecting the display monitor and the body is pulled out of the case member of the body, is guided to the second supporting member through the first supporting member of the supporting mechanism, and is electrically connected to the display monitor.

5. The electronic device according to claim 4, wherein the second supporting member has a wire inlet into which the wiring member for electrically connecting the display monitor and the body is introduced, and the wiring member has a slack portion at the wire inlet.

6. The electronic device according to claim 1, wherein the holding compartment of the case member has a first cam portion and a second cam portion, the abutment portion has a first cam surface abutting on the first cam portion and a second cam surface abutting on the second cam portion, and the supporting mechanism is configured such that the first cam portion presses the first cam surface of the abutment portion and then the second cam portion presses the second cam surface of the abutment portion by rotation of the second supporting member.

* * * * *